US012688203B1

(12) United States Patent
Sood et al.

(10) Patent No.: US 12,688,203 B1
(45) Date of Patent: Jul. 21, 2026

(54) DISTRIBUTED POINT-IN-TIME RESTORE ACROSS STORAGE FORMATS ON A HYBRID DATABASE

(71) Applicant: Microsoft Technology Licensing, LLC, Redmond, WA (US)

(72) Inventors: Armaan Sood, Bellevue, WA (US); Krishnan Sundaram, Bothell, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 2 days.

(21) Appl. No.: 19/030,658

(22) Filed: Jan. 17, 2025

(51) Int. Cl.
*G06F 16/27* (2019.01)

(52) U.S. Cl.
CPC .................................. *G06F 16/278* (2019.01)

(58) Field of Classification Search
CPC ..................................................... G06F 16/278
See application file for complete search history.

(56) References Cited

U.S. PATENT DOCUMENTS

| | | | |
|---|---|---|---|
| 2024/0202197 A1* | 6/2024 | Ma ......................... | G06F 16/285 |
| 2025/0231920 A1* | 7/2025 | Buls ...................... | G06F 16/278 |

* cited by examiner

*Primary Examiner* — Apu M Mofiz
*Assistant Examiner* — Oscar Wehovz
(74) *Attorney, Agent, or Firm* — Barta Jones, PLLC

(57) ABSTRACT

To avoid inconsistencies caused by clock skew across data storage tiers, a point-in-time restore service creates a restore account, restores a partition of the database to its state at the designated point-in-time, including data from that time. A restored value is read from the data and a list is retrieved of segments written to a disaggregated storage tier by the existing partition. The disaggregated storage tier includes a first segment with a first value and a second segment with a second value, the values indicating their creation order. A first comparison is made between the restored value and the first value, and a second comparison is made between the restored value and the second value. Based on these comparisons, the first segment but not the second segment is copied to the restore account.

20 Claims, 8 Drawing Sheets

400 ⟶

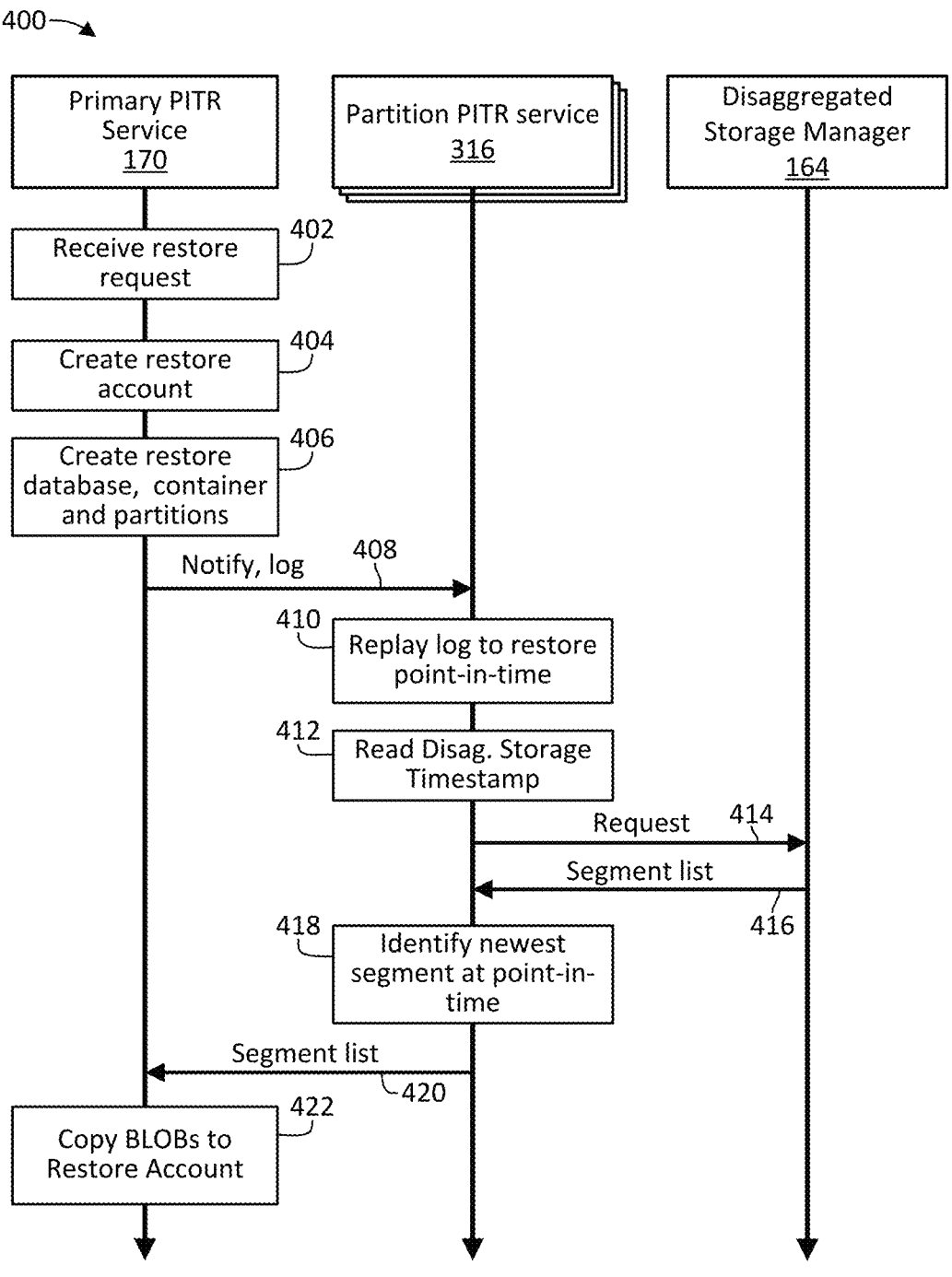

| Primary PITR Service 170 | Partition PITR service 316 | Disaggregated Storage Manager 164 |

402 — Receive restore request

404 — Create restore account

406 — Create restore database, container and partitions

Notify, log  408 ⟶

410 — Replay log to restore point-in-time

412 — Read Disag. Storage Timestamp

Request  414 ⟶

⟵ Segment list  416

418 — Identify newest segment at point-in-time

⟵ Segment list  420

422 — Copy BLOBs to Restore Account

Fig. 4A

DISTRIBUTED POINT-IN-TIME RESTORE ACROSS STORAGE FORMATS ON A HYBRID DATABASE

BACKGROUND

Cloud providers offer, among other services, globally distributed, horizontally partitioned, multi-model database services. Some services are designed to allow customers to elastically scale throughput along with the storage across several geographical regions while offering guaranteed low latency, high availability, predictable throughput, and multiple well-defined consistency models. However, certain architectures such as "shared nothing" or "serverless" architectures are leveraged by many of the database services can be expensive, both in terms of resource consumption and monetary cost, especially as data accumulates in the database and older data, which is less frequently accessed, is maintained at the same level of availability as more recent data. Moving older data to a less expensive storage architecture, but one that is less readily available, is known in the field of data preservation. For example, in prior eras, data maintained in random-access disk storage was offloaded to serial-access tape storage for long-term archiving. Such two-tier database architectures provide ready access to recent data without the cost associated with maintaining the same level of access to long-term data storage.

In addition, cloud database consumers occasionally need to restore a database to a state that existed in a prior point-in-time. For example, data may be corrupted due to a cyber attack and need to be restored to a point prior to the attack.

SUMMARY

Example solutions for distributed point-in-time restoring of hybrid database state across storage formats are described herein. In particular, the solutions presented avoid inconsistency across restored storage tiers despite a presence of clock skew between the storage tiers. The disclosed examples are described in detail below with reference to the accompanying drawing figures listed below. The following summary is provided to illustrate some examples disclosed herein.

In an example solution, a point-in-time restore service receives a restore request that identifies an existing database with a specific partition and a designated point-in-time. In response, a restore account is created, and a partition of the database is restored to its state at the designated point-in-time, including data from that time. The method includes reading a restored value from the data, obtaining a list of segments written to a disaggregated storage tier by the existing partition, where the disaggregated storage tier includes a first segment with a first value and a second segment with a second value, indicating their creation order. The method then performs a first comparison between the restored value and the first value and a second comparison between the restored value and the second value. Based on these comparisons, the method copies the first segment but not the second segment to the restore account.

BRIEF DESCRIPTION OF THE DRAWINGS

The disclosed examples are described in detail below with reference to the accompanying drawing figures listed below:

FIG. 4A is a time-space diagram illustrating by way of example a procedure for recreating a point-in-time state of an existing account of a disaggregated storage tier for a restore account.

Corresponding reference characters indicate corresponding parts throughout the drawings. Any of the figures may be combined into a single example or embodiment.

DETAILED DESCRIPTION

Figure 1A:
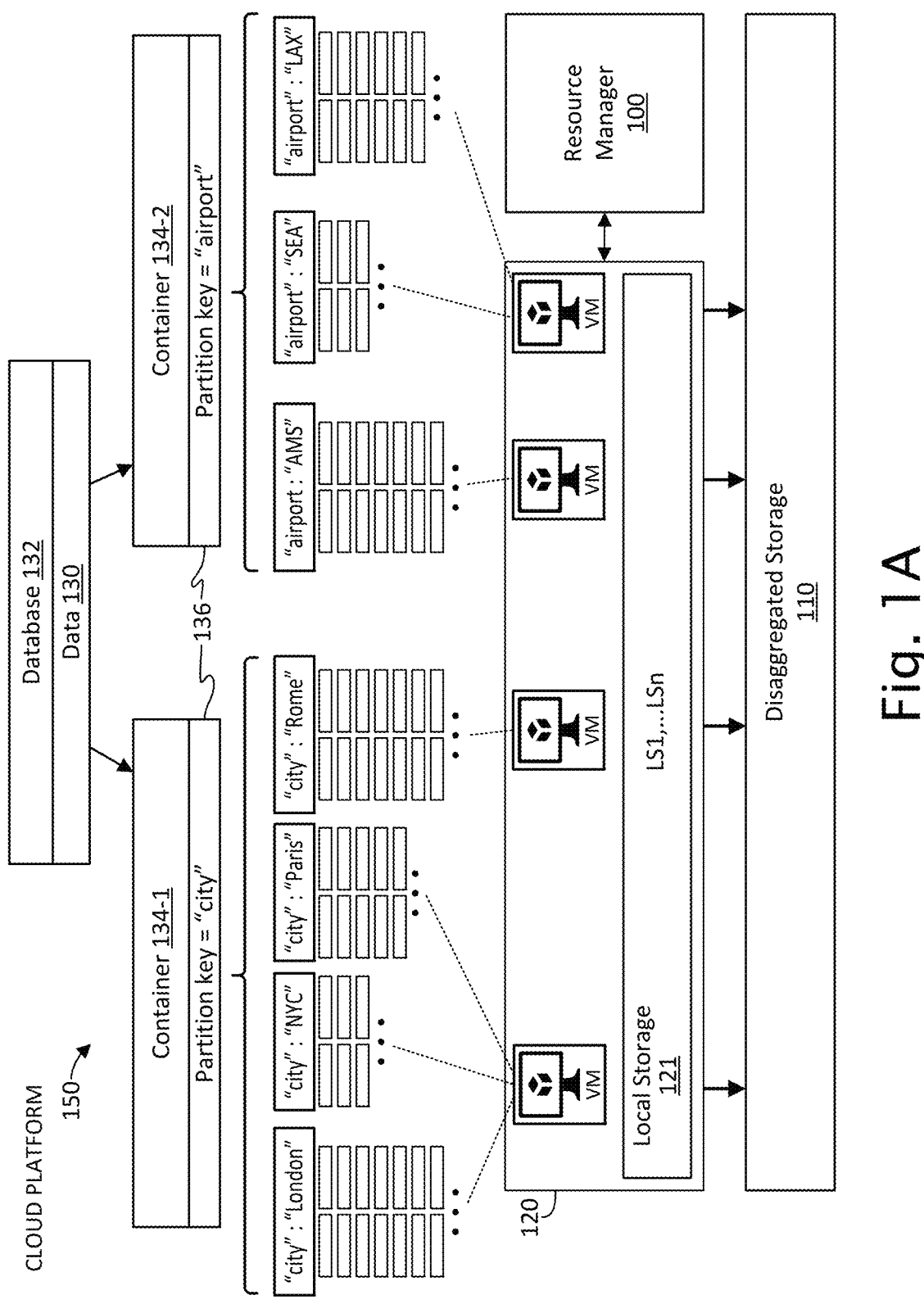
FIG. 1A shows a block diagram of cloud platform implementing an example tiered data storage scheme.

For simplicity and illustrative purposes, the principles of the present disclosure are described by referring mainly to embodiments and examples thereof. In the following description, numerous specific details are set forth to provide an understanding of the embodiments and examples. However, benefits of the presently described technology may be achieved without many of the specific details described. In some instances, well-known methods and/or structures have not been described in detail so as not to unnecessarily obscure the description of the embodiments and examples. Furthermore, the embodiments and examples may be used together in various combinations.

An architecture that is widely in use in the database systems of cloud environments is the shared-nothing architecture, which provides storage and computing resources that are generally scaled together. Often, much of the data in a cloud platform-based database, and in particular older data, is not regularly accessed. However, in a shared-nothing architecture, the rarely accessed data continues to be stored in data structures built for high-availability (HA) conditions that fulfill stringent performance requirements with minimal response times. While the users may require large data storage to store data that is constantly being generated by the various devices, high availability of all the data thus generated is neither necessary nor desired. This is because high availability translates into higher costs for data storage. For cloud providers, the shared-nothing data storage uses computational hardware resources that are better employed for other mission-critical applications. However, users may require at least a portion of the data to be accessible under HA conditions. Furthermore, the portion of data to be made available under HA conditions may differ from time to time. Many of these challenges can be addressed if the storage and computational resources can be scaled independently so that the computational resources can be flexibly assigned as required over a specified amount of data.

Described herein is a "shared-nothing/shared disk" based tiered storage system for cloud platforms which makes available a portion of the data that is frequently accessed as "hot data" that fulfills conditions for HA while another portion of the data that is less frequently accessed is stored as "cold data." A resource management apparatus on the cloud platform includes a processor and memory storing processor-executable instructions as a request receiver, a data retriever, and a compute optimizer that enable implementation of the tiered storage. The hot data is stored in a local storage medium of a partition (e.g., a virtual machine (VM) or other virtual computing instance) on the cloud platform, and the cold data is stored in a disaggregated storage tier (also referred to herein simply as "disaggregated storage") that is shared by the partitions on the cloud platform. The partition receives data from a partition that is identified by a partition key. A local data manager within the partition stores the data including documents received from the partition to the local storage medium and in an in-memory table (memtable).

The memtable is an in-memory data structure that can have a fixed, predetermined maximum size and is used to store a copy of the hot data as a segment. When the memtable in a local storage medium attains the maximum size with the addition of the documents, the local data manager generates an immutable segment from the memtable and stores or flushes the immutable segment to the disaggregated storage. In this instance the term "flushing" refers to copying the immutable segment to the disaggregated storage and deleting the local copy at the partition. After the segment is flushed to the disaggregated storage, the memtable is deallocated by the local data manager, which continues to store the hot data in the local storage medium until certain criteria, e.g., time-to-cold (TTC criteria) are met. TTC criteria can include but are not limited to, temporal criterion, e.g., data is stored for a predetermined time, access criterion, e.g., data is accessed within a preceding predetermined time interval, or a combination of different criteria. When a memtable satisfies the TTC, the local data manager deletes the memtable from the local storage medium of the VM.

In an example, the local data manager formats the segment as a .avro file, i.e., in Avro format, which is a serialization framework created by the Apache Software Foundation based on JSON that serializes data into a compact binary format. Apache Software Foundation based on JSON that serializes data into a compact binary format. While some examples are described herein with reference to the Avro and/or JSON formats, aspects of the disclosure are operable with other formats. The local data manager generates an inverted index for a segment that includes a range of search keys associated with the various documents stored therein. The disaggregated storage manager groups segments in the disaggregated storage into sorted runs based on consecutive corresponding partition keys or non-overlapping search key ranges in an ascending or descending search key order. Furthermore, the disaggregated storage manager assigns levels to the sorted runs based on time stamps so that newly formed sorted runs are placed in higher levels. The disaggregated storage manager generates metadata maps for storing metadata of the segments and sorted runs, which enables identification of the segments for search or other purposes.

The tiered storage for cloud platforms disclosed herein enables a hybrid shared-nothing/shared-disk storage architecture. The resource management apparatus executes the various processes via backend components (e.g., database partitions) and stores data in the disaggregated storage.

The disclosed resource management apparatus and processes leverage the distributed nature of log-structured merge (LSM)-trees (as described in more detail below) to provide for a technical improvement enabling scaling up or scaling down resources as needed without movement of data. Since segments are clustered by partition keys, physical partitions can be scaled up and down easily by being given a partition key range logical view. Thus, a view of immutable segments in the disclosed tiered storage scheme provides for greater elasticity as opposed to other architectures such as B-trees, where each compute instance may access fragmented pages of the mutable B-tree file which would require locking.

Another technical improvement afforded by the disclosed tiered storage is that it is subscriber configurable, and can accommodate varying requirements of data availability and cost. For example, if a cloud subscriber requires high performance and availability for 100% of data, the subscriber can stay on a 100% shared-nothing architecture with the data being stored on the local storage only without being flushed to the disaggregated storage. If 100% performance is required only for 10% of data (hot data) and of data while resource efficiency/scalability is preferred for the remaining 90% of the data then the service can switch to a hybrid shared-nothing/shared-disk architecture (tiered storage), allowing the 90% of data to be maintained in a disaggregated storage tier. If a customer prefers a serverless model where resources are assigned only when required, a 100% shared-disk architecture can be implemented so that the resource management apparatus can efficiently instantiate additional partitions without any data movement. Thus, the tiered storage scheme disclosed herein based on "shared-nothing, shared disc" architecture provides for a technical improvement over existing architectures in enabling more efficient or optimized use of computational resources as such resources can be instantiated as needed. The computational resources need not be assigned in advance as required by shared-nothing architecture nor do the computational resources have to be made completely inaccessible as in the serverless architecture.

The technology also enables subscribers to restore an account, a database, or a container to a prior point-in-time, such as sometime over the last 30 days. Restoring data to the prior point-in-time involves recreating partitions in a new account, referred to herein as a "restore account." Segments maintained in the disaggregated storage tier associated with restored partitions are likewise copied to the restore account, and a mechanism is described herein for ensuring consistent point-in-time restore (PITR) across data tiers despite a possibility for clock skew between the systems.

Accordingly, the technology described herein improves the efficiency of computing devices, for example, ensuring PITR is performed efficiently and consistently across multiple data storage tiers. The database is optimized for write-intensive workloads in which hot data is rapidly searched and retrieved, while cold data is inexpensively maintained and efficiently indexed and searched.

Platform Architecture

FIG. 1A shows a block diagram of cloud platform 150 implementing a tiered data storage scheme in accordance with an embodiment of the present disclosure. Cloud platform 150 receives data 130 from external data sources such as database 132. By way of illustration and not limitation, a brief description of the external data sources is provided herein. In an example, the external data sources can be NoSQL data sources. Database 132 is logically partitioned into a number of containers or partitions 134-1 and 134-2 identified by corresponding partition keys 136 (PKs). For example, as shown in FIG. 1A, container 134-1 is characterized by partition key "city" while container 134-2 is characterized by partition key "airport." Data 130 associated with different values of a particular partition key is transmitted to different VMs 120 on cloud platform 150. Resource manager 100 is also included in cloud platform 150. Each of the VMs also includes corresponding local storage (LS) which are numbered LS1 to LSn and referred to collectively as local storage 121. Disaggregated storage 110 is shared by VMs 120. Resource manager 100 implements a two-tiered data storage scheme for the clients of the cloud platform 150 based on the hybrid "shared nothing— shared disk" architecture. This architecture enables resource manager 100 to store data 130 as hot data on the hot tier including the local storage 121 and as cold data on the cold tier that includes the disaggregated storage 110 as further detailed herein.

Figure 1B:
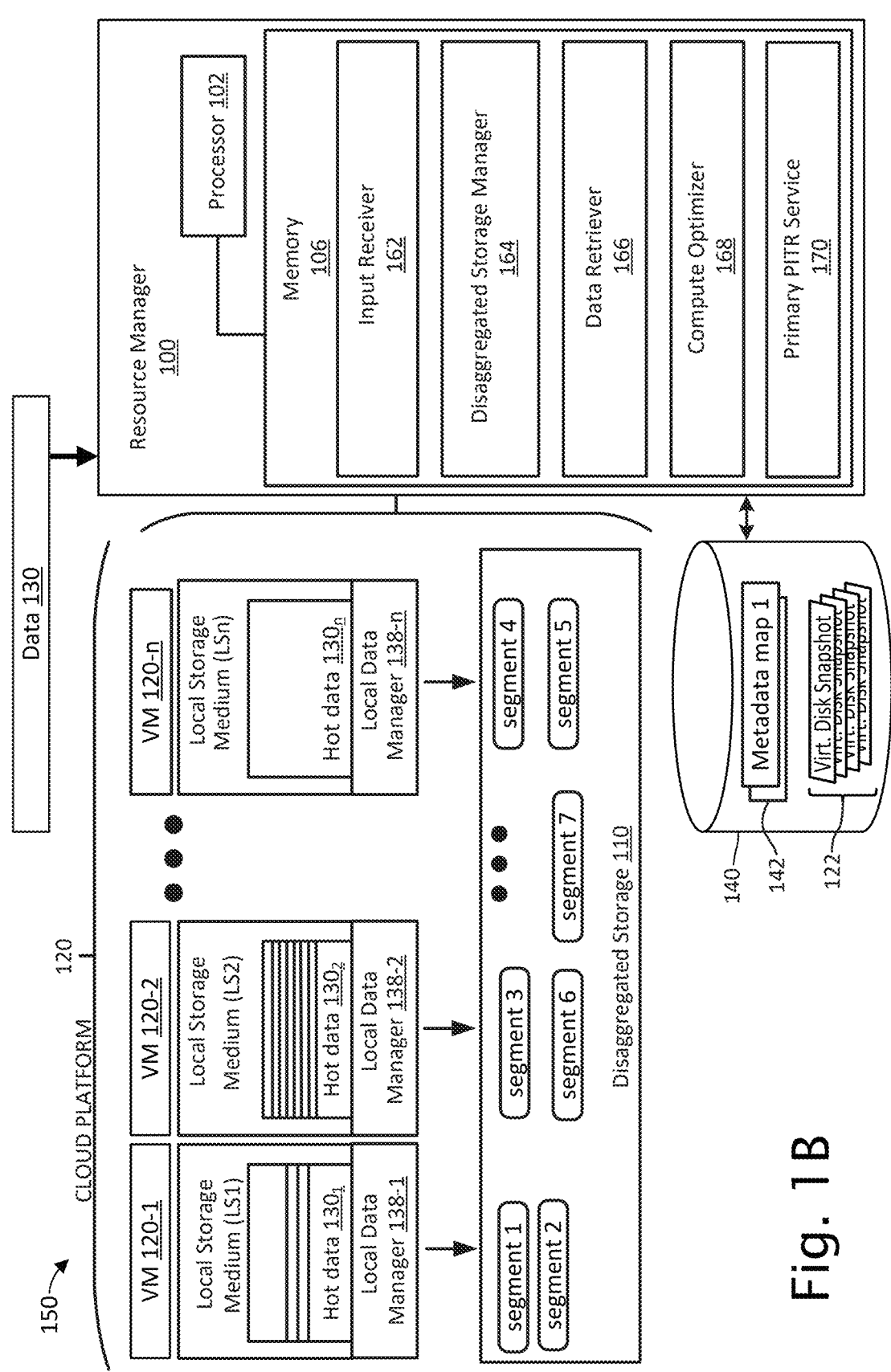
FIG. 1B shows the cloud platform with a resource manager.

FIG. 1B shows cloud platform 150 with resource manager 100, in accordance with an embodiment of the technology described herein. Although resource manager 100 is illustrated as a single system, in an implementation it may include a cluster of systems, and different functions and services provided by resource manager 100 may execute on different physical or virtual compute resources. Resource manager 100 includes processor 102 coupled to data store 140 and memory 106 that stores modules with programming instructions to implement the tiered storage scheme disclosed herein. Represented in memory 106 is a series of functional blocks corresponding to sets of instructions for carrying out corresponding functionality. However, it should be understood that different functionality can reside in different applications and in fact on different systems altogether. Accordingly, the representation in FIG. 1B of resource manager 100 is a representative system that could as well be implemented in various ways such as a clustered, distributed, containerized microservices, etc. In the representative system shown, input receiver 162 provides background processes to collect data 130 to be stored in the two data tiers of cloud platform 150. Disaggregated storage manager 164 manages 'hot data' and 'cold data' in the hot and cold tiers. Data retriever 166 enables retrieval of records or documents from one or more of the local storages and disaggregated storage 110. Compute optimizer 168 instantiates new VMs or deletes existing VMs as needed. Primary PITR service 170 restores data to a prior point-in-time as herein described.

Each of the VMs 120, e.g., VM 120-1, VM 120-2, . . . VM 120-n, hosted on cloud platform 150 is associated with a corresponding local storage LS1-LSn. In an example, the local storage of a VM can include a virtual disk maintained on a solid-state drive (SSD) of a computer (not shown) that hosts the VM. The local storage of a given VM, e.g., LS1 of VM 120-1, is configured to store the data corresponding to the partition key(s). For example, if LS1 is the local storage for partition key {city="London" } and data 130 includes an update to London data then disaggregated storage manager 164 stores the data 130 in LS1. Data corresponding to a particular partition key is not distributed across the local storage media. For example, LS1 stores all "hot" data $130_1$ for partition keys "London" and "NYC" so that this data is not stored in any other local storage media. Hot data $130_1$ in LS1 is deleted when preconfigured threshold criteria or condition(s) (Time to Cold (TTC)) are met. Each of the plurality of VMs 120 also includes a corresponding local data manager 138-1, 138-2, . . . 138-n.

A local data manager, e.g., local data manager 138-1, formats the data to be stored to disaggregated storage 110 into immutable "segments." An immutable segment is a segment of data which, once sealed, is not modified. As used herein, "sealed" refers to marking the segment as sealed which indicates that it is not to be modified. The marking can be in a data structure referencing the segment or incorporated into the segment itself. While the functions of the local data manager are described below with reference to the local data manager 138-1, it can be understood that such description is equally applicable to other local data managers 138-2, . . . , 138-n, unless otherwise specified. Local storage manager 138-1 writes documents into segments of data. When a segment is full, local data manager 138-1 seals the segment and stores a copy of the sealed segment in disaggregated storage 110. For example, the hot data $130_1$ in LS1 indicates a partially filled segment (i.e., a segment that contains less data than a target capacity for the segment) hot data $130_2$ in LS2 shows a filled segment that can be sealed while hot data $130n$ in LSn shows an empty segment, i.e., a segment data structure without any data. The different segments (i.e., "segment 1" through "segment 7") shown in disaggregated storage 110 are filled segments that were flushed from one or more of the local storage media LS1, LS2, . . . , LSn. Disaggregated storage manager 164 maintains one or more metadata maps 142 for identifying segments in the disaggregated storage 110 for query processing or other purposes as detailed herein. In an example, disaggregated storage 110, which may be referred to as a single entity, includes a network of multiple storage devices that store data configured into a specific format by the manager 100.

Under the tiered storage scheme, access to hot data $130_1$ meets certain access criteria. In an example, VMs 120-1 to 120-n are managed with high availability (HA) technologies, ensuring rapid response and restoration of a VM if it (or the hardware platform on which it is running fails. In such an example, the VM is quickly restarted on another physical server. In contrast, cold data maintained on disaggregated storage 110 does not have lower data availability requirements. When TTC for a set of hot data (e.g., a document) expires, local data manager 138-1 deletes the set of hot data $130_1$ of VM 120-1 from LS1 while cold data remains on the disaggregated storage 110. TTC can be set based on user requirements and criteria. TTC can be defined in terms of one or more criteria such as, but not limited to, temporal criteria, frequency and/or recency of access, etc.

Point in Time Restore

Figure 2:
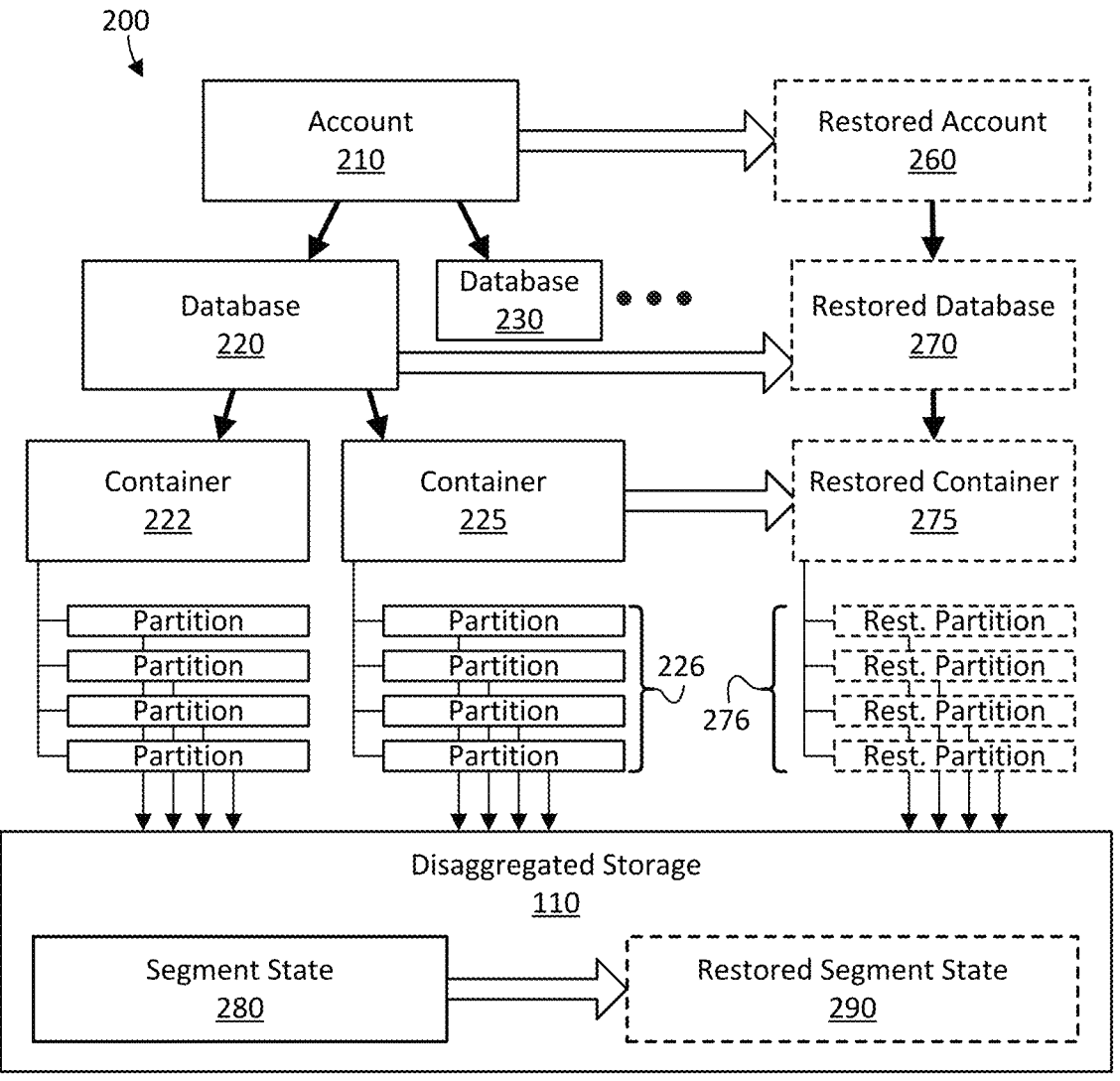
FIG. 2 shows a block diagram illustrating by way of example a process for restoring data of a database to a prior point-in-time.

FIG. 2 shows a block diagram 200 illustrating at a high level and by way of example a process for restoring data of a database to a prior point-in-time. In an exemplary system as described above with reference to FIGS. 1A and 1B, the platform architecture includes an account 210, the account having one or more databases (e.g., database 220, database 230) associated with it. Each database, e.g., database 220 has one or more containers (e.g., containers 222, 225). The "containers" are logical constructs associated with a partition key category such as "city" with each partition "within" that container having one or more cities assigned thereto as previously described. The "account," "database," and "container" are logical objects comprising configuration information, and, in an exemplary implementation, are managed by a management entity such as resource manager 100, shown in FIGS. 1A and 1B.

Referring to the example shown in FIGS. 1A and 1B, partitions 226, 276 are implemented by VMs 120. VMs are virtualized compute platforms that include virtual processors, memory, networking and other hardware resources. As software constructs, it is possible to capture, at any moment in time, the state of a VM's virtualized processor, networking, memory, etc., into a data structure referred to as a snapshot. Once captured, the snapshot can be restored onto a new server and once restored, the VM is restarted so that it continues running from the moment its state was captured as though it had never been interrupted. Periodically, snapshots 122 are taken of VM states and stored in physical storage devices, either in local storage devices such as SSDs or in a central location such as a centralized data store 140. In either case, restored partitions 276 are VMs created from snapshots 122 from partitions 226. Once VMs are created for partitions 276 from the snapshots, the state of each partition is brought to the designated point-in-time by replaying an operations log up to that point-in-time. In an example, the operations log for each restored partition 276 is retrieved from the corresponding existing partition 226.

Segment state 280 comprises all the segments associated with each partition 226 of container 225 and other containers of database 220 such as container 222, as well as for other databases of account 210 and other accounts (not shown). Each partition generates a set of segments belonging to an LSM-tree. LSM-trees are well-known write-optimized data structures designed for systems with frequent writes and high storage efficiency needs. Data is initially written to the memtable as described above and periodically flushed as sorted immutable segments. LSM-trees are composed of a hierarchy of storage levels wherein each level contains sorted data organized into distinct immutable segments. The newest segments, i.e., segments most recently flushed from a partition as described in further detail below, are conceptually added to the top level (Level 0) of the LSM-tree. As segments accumulate at a level, they are merged and compacted into the next level to reduce overlaps and maintain a globally sorted order across levels. Each subsequent level is typically larger and less fragmented than the previous one, storing consolidated data with minimal redundancy. When a subscriber enables PITR, Resource manager 100 is instructed to soft-delete compacted segments such that they are treated as deleted but not actually removed from disaggregated storage 110. Restored segments 290, which could include soft-deleted segments as well as active (i.e., undeleted) segments in segment state 280, are copied from existing account 210 to restored account 260 by PITR service 170 (FIG. 1B). In an example implementation, PITR service can be enabled or disabled by a subscriber, and when enabled, maintains data retention for 30 days, allowing a subscriber to restore an account, database, or container to any point-in-time over the past 30 days from the date the PITR is requested. In alternative embodiments, other retention periods can be provided or configured by the subscriber. After the data retention period, soft-deleted segments are fully deleted (e.g., the segment is no longer discoverable via the storage API and physical blocks or sectors occupied by the segments on storage media are permitted to be overwritten).

Figure 3:
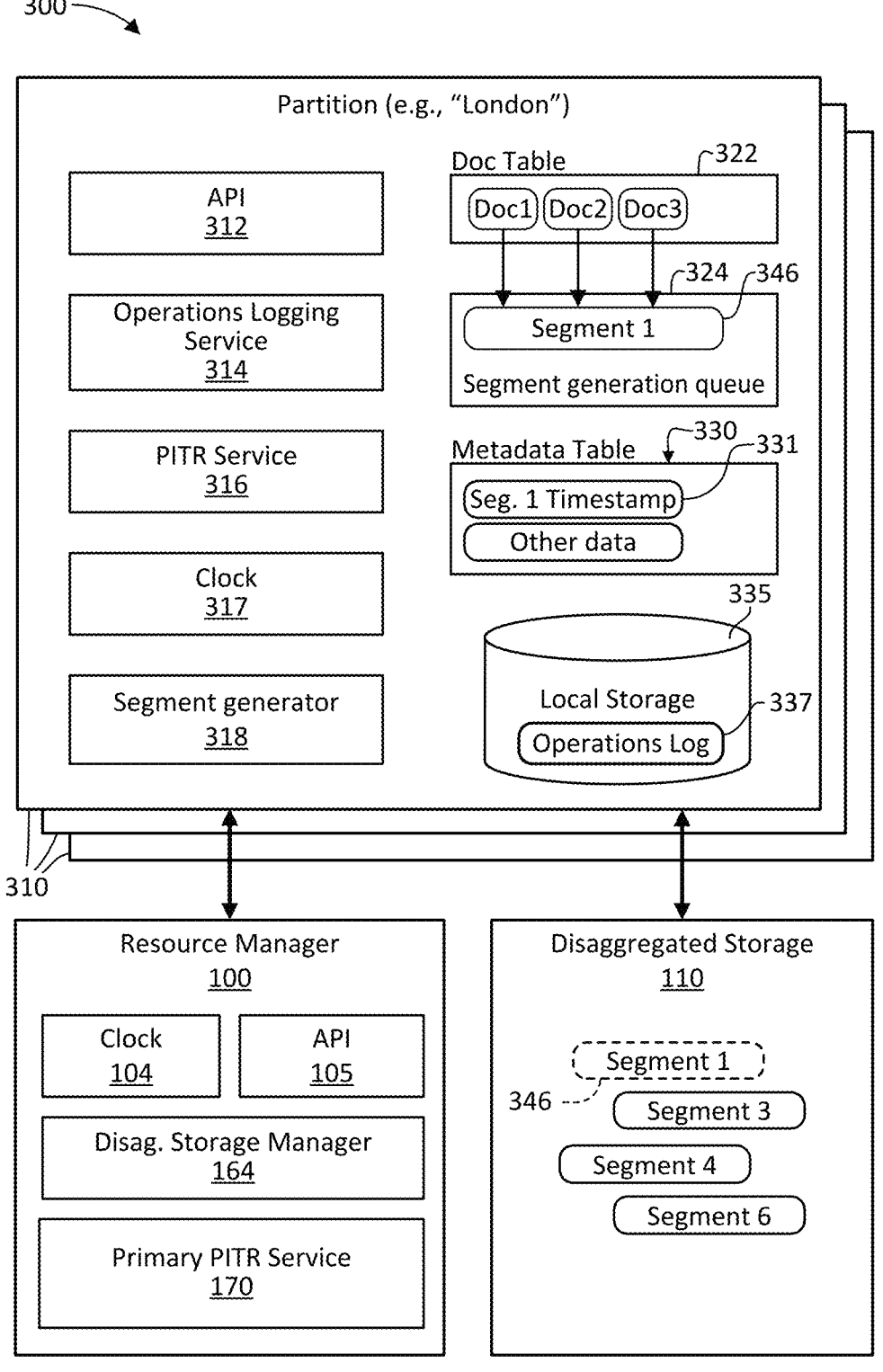
FIG. 3 shows a functional block diagram illustrating by way of example a representation of an architecture for creating restored segments.

FIG. 3 shows a functional block diagram illustrating by way of example a representation 300 of an architecture for creating restored segments 290 as described above with reference to FIG. 2. In an exemplary implementation, partitions 310 are implemented by VMs 120-1 . . . 120-n, described above with reference to FIG. 1B. In alternative embodiments, each partition 310 comprises a physical computing instance or a distributed scalable containerized application having a microservices-based architecture, in which individual microservices may be shared by multiple partitions 310, while other services are specific to a particular partition. Regardless of the software architecture of partitions 310, each partition comprises software executing on physical computing hardware, such as that described below with reference to FIG. 11.

Each partition 310 comprises software illustrated in FIG. 3 by way of a set of functional blocks. Each functional block corresponds to segments of executable code for performing one or more functions. In exemplary embodiments, one or more functional blocks may correspond to, e.g., local data manager 138-n, illustrated and described above with reference to FIG. 1B. Therefore, functional blocks described herein may each be a component of a particular software application or service or may be separated into different software applications or services. Accordingly, FIG. 3 should be understood as representing various functionalities of partitions 310, not a particular physical software architecture. Furthermore, it should be understood that representation 300 is not exhaustive of all functionalities of partitions 310 but illustrates certain functionalities pertinent to PITR mechanisms described herein, along with some useful contextual information. Functional blocks include API 312, operations logging service 314, partition PITR service 316, clock 317, and segment generator 318. In addition, certain data structures are illustrated, including document table ("doc table") 322, segment generation queue 324, and metadata table 330. Local storage 335 (referred to in FIGS. 1A and 1B as local storage 121) contain operations log 337. Below partitions 310, resource manager 100 and disaggregated storage 110, described above with reference to FIGS. 1A and 1B, are illustrated.

API 312 provides a communication endpoint for database access requests and/or for control communication, e.g., to and from API 105 of resource manager 100. API 312 handles numerous other interactions for data management, node management, bulk operations, etc. In an example interaction, a client requests that document 1 ("Doc1") be stored into the database. API receives the write requests and responds by storing a copy of document 1 into document table 322. In another example interaction, a client requests retrieval of document 2 ("Doc2"). In response, API 312 fetches Document 2 from document table 322. In a third example interaction, API 312 retrieves a client request to process a query. In response to the query request, API 312 forwards the query to a query engine (not shown). Finally, a PITR request may be received from primary PITR service for coordinating PITR for disaggregated storage 110, as further described below.

Operations logging service 314 logs all operations performed by partition 310 and is capable of replaying operations for advancing a state of a restored partition from a snapshot state to a designated point-in-time state, e.g., when restoring partition 310 to a point-in-time as described above.

Clock 317 keeps system time for partition 310. In an exemplary embodiment, clock 317 is synchronized with a centralized network time protocol (NTP) server (not shown).

Segment generator 318 is responsible for moving data from document table 322 to disaggregated storage 110. In an example implementation, periodically, e.g., when segment generation queue 324 exceeds or meets a data size threshold, a new segment 346 in segment generation queue 324, which contains documents from document table 322 and other related data such as indexing data, document deletion indications, etc., is written to disaggregated storage 110 as a new segment.

Primary PITR service 170 enables a subscriber to receive a PITR request and can manage the restore process for recreating the databases, and containers to a restore account as described above as well as copying segments from the existing to the restore account so that the segments written to the disaggregated storage tier are synchronized to the same point-in-time as the associated partition that wrote the segments. In a naïve approach for restoring segments 346 in disaggregated storage 110 would be to provide the point-in-time of the restore request to resource manager 100 and instruct it to copy any segments prior to that date over to restore account 260. A problem with that approach, though, is that, because the partitions 226, 276 reside in a separate storage tier and separate physical system from disaggregated storage 110, there may be some clock skew between clock 317 in a partition and clock 104 of resource manager 100, which could result, if uncompensated, in an inconsistent state between the point-in-time state of the existing account and the recreated state in the restore account. This could lead to functional disruptions if, for example, a restored partition 310 believed it just wrote a segment to the disaggregated storage but the written segment is not present, i.e., not copied to the restored account, due to the clock skew.

Figure 4B:
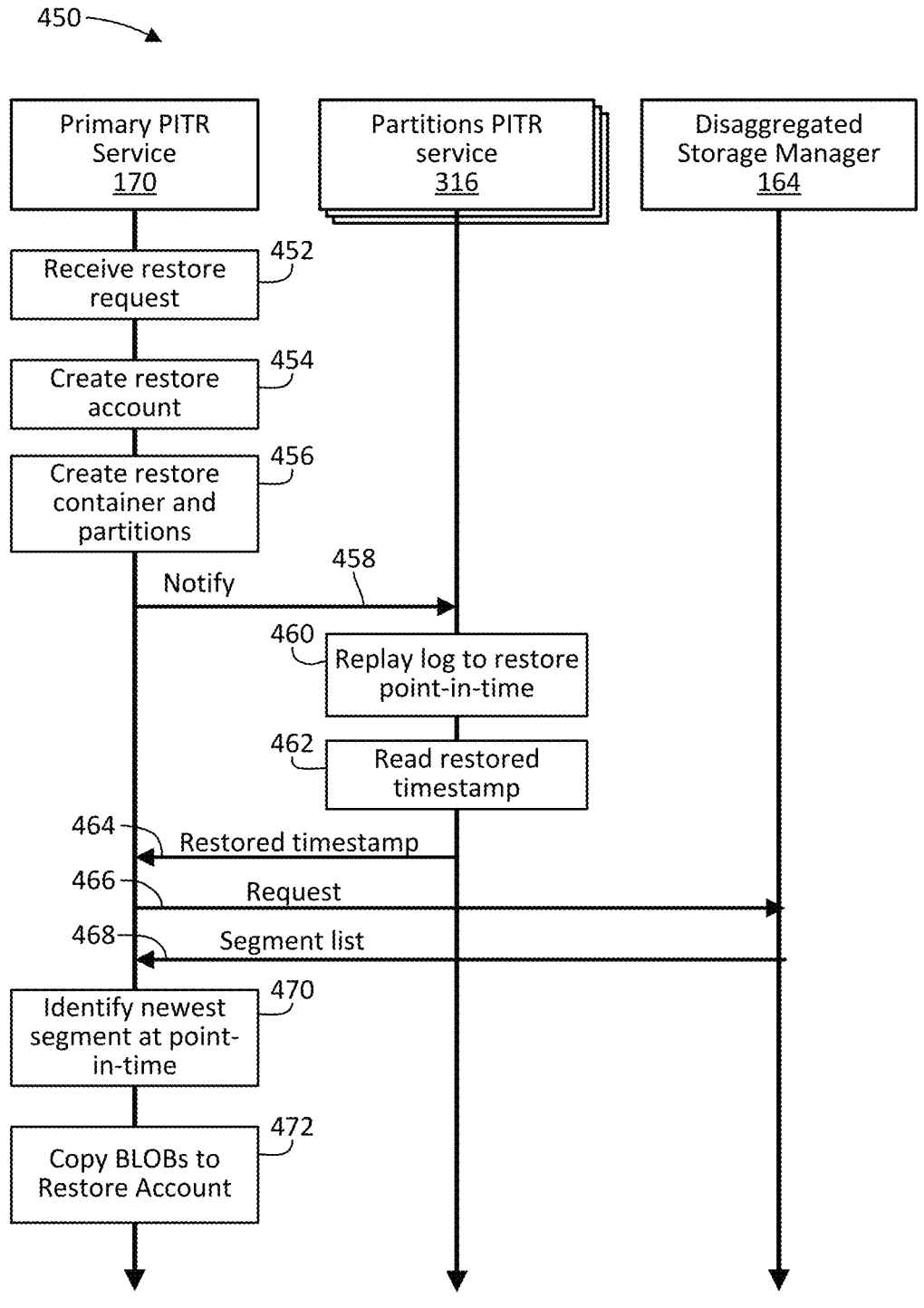
FIG. 4B illustrates an alternative example approach for restoring a disaggregated storage tier of a database to a designated point-in-time.

FIGS. 4A and 4B show example approaches for ensuring a consistent restored state despite any click skew. Description of these approaches below will refer to FIGS. 2 and 3. Operations shown in FIGS. 4A and 4B will be identified in the description below by reference numbers within parentheses following a verb corresponding to the operation. FIG. 4A is a time-space diagram illustrating by way of example a procedure 400 for recreating a point-in-time state of an existing account of a disaggregated storage tier for a restore account. Example procedure 400 is initiated when primary PITR service 170 receives (402) a restore request. In an example implementation, a cloud subscriber may wish to restore an entire account (e.g., account 210), a database or set of at least one databases of an account (e.g., database 220), or a single container of a database of an account (e.g., container 225).

In response to receiving the restore request, primary PITR service 170 creates (404) a restored account (e.g., restored account 260). Then, PITR service 170 creates (406) one or more restore databases (e.g., restored database 270), one or more restore containers (e.g., restored container 275, and restore partitions (e.g., restored partitions 276). Restore databases and containers comprise logical objects defining configurations of the database and containers. Restore partitions comprise, in an example implementation, VMs created form snapshots of partition VMs providing existing partitions in the existing account.

Primary PITR service 170 then transmits notification 408 to partition PITR service 316 in partitions 310 that are restored partitions, prompting them replay (410) the operations log from the corresponding existing partition up to the point-in-time designated by the restore request received at (402). In an exemplary implementation, primary PITR service retrieves the operation log from the existing partition; in an alternative approach, the restore partition retrieves the log from the existing partition. In any case, the restored partition obtains the log from the existing partition and replays (410) the log to the designated point-in-time.

Once the restored partition is in the point-in-time state (i.e., after replaying the log up to the designated point-in-time) partition PITR service 316 reads (412) a disaggregated storage timestamp, which is a timestamp received by the existing partition from disaggregated storage manager indicating a time of the most recently written segment 346 as of the point-in-time. In other words, when segment generator 318 writes a segment to disaggregated storage 110, disaggregated storage manager reads the time of creation from clock 104 and sends that timestamp to the partition, which stores it in a particular location, e.g., in a disk file or in memory. Therefore, at any point-in-time, the partition knows when, from the perspective of resource manager 100 (and by extension from the perspective of disaggregated storage 110) the time that the segment was generated, which is independent of clock 317 within the partition.

After reading the timestamp at (412), partition PITR service 316 issues a request 414 to disaggregated storage manager 164 for a list of segments. Disaggregated storage manager 164 responds with a segment list 416, which includes segment identifiers and timestamps associated with each segment, the timestamps indicating the date of creation of those segments.

Partition PITR service 316 identifies (418) the newest segment at the point-in-time by comparing the timestamp locally stored in the restored partition (i.e., the timestamp read in (412)) with the timestamps of the segments in the segment list 416. Since all the timestamps originated from a common clock, i.e., clock 104, there will be no issue of time skew as would occur if the timestamps of the segment queue were to be compared with the designated point-in-time as would be the case with the naïve approach described above.

Partition PITR service 316 the passes a list 420 of all segments to be copied having timestamps up to the timestamp read at (412) (which could include soft-deleted segments as previously mentioned) to primary PITR service 170, which then proceeds with copying the listed segments to the restore account (e.g., restored account 260).

While the above approach describes the use of timestamps, any increasing or decreasing value could be used instead, provided that it is usable to determine an order of creation of the segments. In an example implementation, each segment, upon creation, is assigned reference number that is incremented from the reference number assigned to the previously created segment. When a segment is created, disaggregated storage manager 164 provides the current reference number to partition 310, which stores the value as previously described with respect to a timestamp. When a new restored partition is deployed, the reference value is used to identify the latest segment created at the designated point-in-time, and that segment, plus all previously written segments, according to the list supplied by disaggregated storage manager 164. Regardless of whether a timestamp or other type of value is used, all that is required is that the value that is provided by the disaggregated storage manager specifies an order of creation for the segments.

FIG. 4B illustrates alternative approach 450 for restoring a disaggregated storage tier of a database to a designated point-in-time. Approach 450 operations 452, 454, 456, 458, 460, and 462 proceed as described above with reference to FIG. 4A. After receiving restored timestamp value 331 recreated in partition 310, partition PITR service 316 transmits the restored timestamp value 464 to primary PITR service 170. Primary PITR service 170, sends request 466 for the segment list from disaggregated storage manager 164 which responds with segment list 468. Once primary PITR service 170 has restored timestamp value 464 and the segment list 468, it can identify (470) the most recently created segment by the existing partition as of the designated point-in-time, and copy (472) that segment and all prior segments to the restored account as described above.

Figure 5:
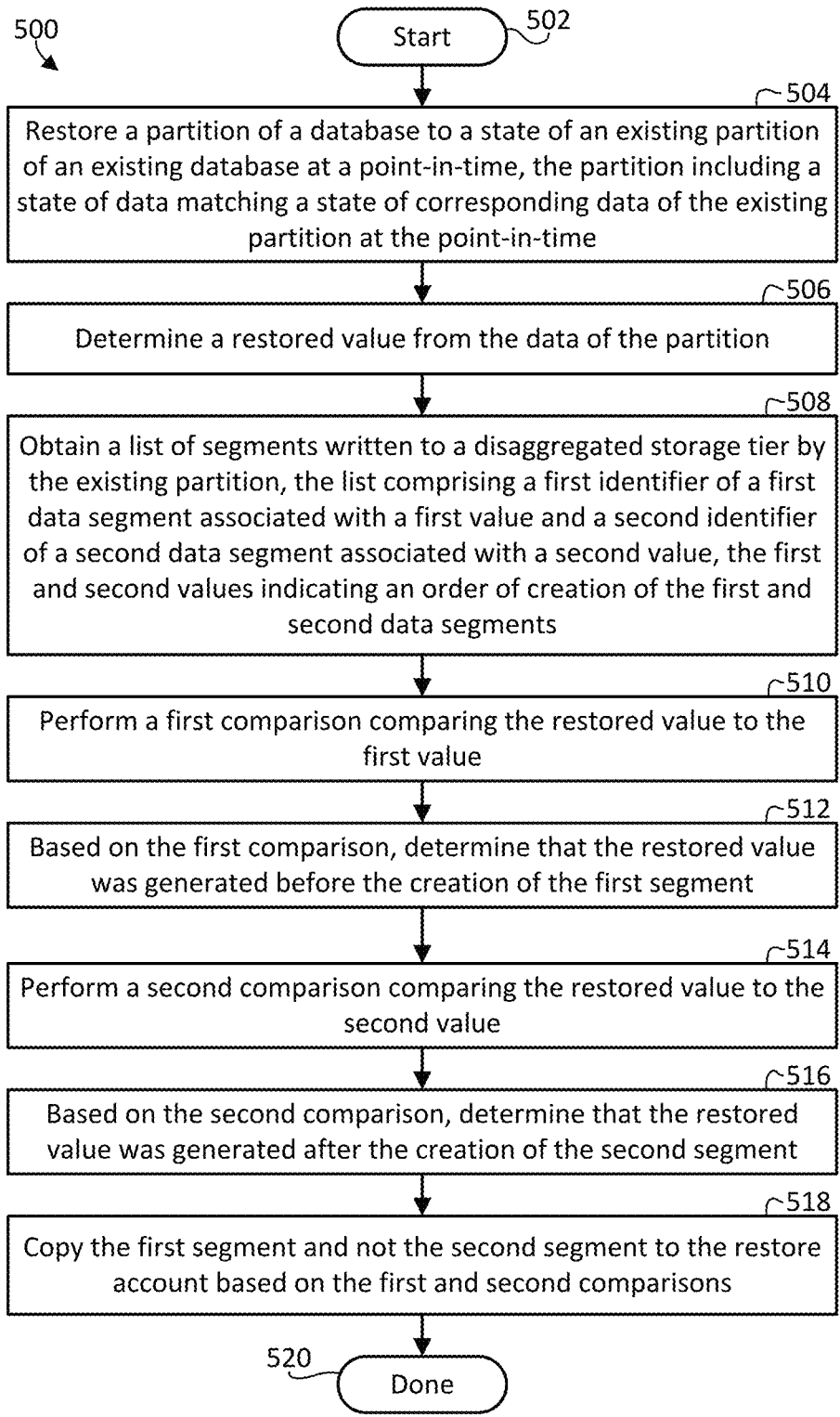
FIG. 5 shows a flowchart illustrating by way of example a procedure for restoring a disaggregated storage tier of a database.

FIG. 5 shows a flowchart illustrating by way of example a procedure 500 for restoring a disaggregated storage tier of a database. Procedure 500 begins as indicated at start block 502 and flows to operation 504, wherein a partition of a database is restored to a state of an existing partition of an existing database at a point-in-time, the partition including a state of data matching a state of corresponding data of the existing partition at the point-in-time. In examples described above, the partition is a VM that is restored to the state of the existing partition at the point-in-time using a combination of snapshot and operation logging technologies to bring the partition VM to the state of the existing partition as it was at the point-in-time.

In operation 506, a restored value is determined from the data of the partition. In an exemplary implementation, a partition PITR service performs this operation.

In operation 508, a list of segments written to a disaggregated storage tier by the existing partition is obtained. In exemplary embodiments the partition PITR service or a primary PITR service performs operation 508 and pulls or requests the list of segments from disaggregated storage manager 164. The list includes an identifier for a first segment associated with a first value, and a second identifier for a second segment associated with a second value, wherein the first and second values indicate an order of creation of the first and second segments. in an example implementation described above, the value is a timestamp generated by disaggregated storage manager 164. In an alternate approach, the value is an incrementing value assigned by disaggregated storage manager 164.

In operation 510, a first comparison comparing the restored value to the first value is performed. In operation 512, the restored value is determined to be generated before the creation of the first segment based on the first comparison. In operation 514, a second comparison comparing the restored value to the second value is performed and in operation 516, the restored value is determined to be generated after the creation of the second segment based on the second comparison. In one implementation discussed above with reference to FIG. 4A, the first and second comparisons and the determinations are performed by the partition PITR service running inside the partition. In another example implementation discussed above with reference to FIG. 4B, the first and second comparisons, and the determinations are performed by the primary PITR service running in (or in conjunction with) storage manager 100.

In operation 518, the first segment, and not the second segment, are copied to a restore account associated with the restored partition, e.g., to bring the restore account to match a state of the existing account at the designated point-in-time. After copying the segments, the procedure ends as indicated by block 520.

ADDITIONAL EXAMPLES

An example computer system includes a processor and a memory storing software arranged to execute on the processor, the software comprising instructions operative upon execution by the processor to: create a restore partition of a database in a restore account to a state of an existing partition of an existing database at a point-in-time, the partition including a state of data matching a state of corresponding data of the existing partition at the point-in-time; read a restored value, the restored value being a component of the state of the data; obtain a list of segments written to a disaggregated storage tier by the existing partition, the list including a first identifier of a first segment associated with a first value and a second identifier of a second segment associated with a second value, the first and second values indicating an order of creation of the first and second segments; perform a first comparison, the first comparison comparing the restored value to the first value; perform a second comparison, the second comparison comparing the restored value to the second value; and based on the first comparison and the second comparison, copy the first segment and not the second segment to the restore account.

Alternatively, or in addition to the other examples described herein, examples include any combination of the following:

Wherein the restored value was received at the existing partition from the disaggregated storage tier at a time that a most recently written segment was written to the disaggregated storage tier by the existing partition.

Wherein the restored value is a timestamp originating from a clock associated with the disaggregated storage tier that indicates the time that the most recently written segment was written to the disaggregated storage tier by the existing partition.

Wherein the list of segments includes soft-deleted segments and active segments, and, for each segment, a corresponding value indicating the order of creation of the segments.

Wherein the corresponding values indicate a time of creation of the segments according to a clock associated with the disaggregated storage tier.

Wherein the instructions are further operative upon execution by the processor to copy, to the restore account, additional segments associated with the existing partition that were created before the first segment.

Wherein the copying of the first segment to the restore account comprises creating a copy of the first segment in the disaggregated storage tier and associating the copy with the restore account.

An example computerized method comprises: at a point-in-time restore service, receiving a restore request, the restore request comprising an identification of an existing database having an existing partition and a designated point-in-time; in response to the restore request, creating a restore account and restoring, to the restore account, a restored partition of the database to a state of the existing partition at the designated point-in-time, the restored partition including data restored from the point-in-time of the existing partition; reading a restored value, the restored value being a component of the data; obtaining a list of segments written to a disaggregated storage tier by the existing partition, the disaggregated storage tier comprising a first segment associated with a first value and a second segment associated with a second value, the first and second values indicating an order of creation of the first and second segments; perform a first comparison, the first comparison comparing the restored value to the first value; perform a second comparison, the second comparison comparing the restored value to the second value; and copy the first segment and not the second segment to the restore account, based on the first comparison and the second comparison.

Alternatively, or in addition to the other examples described herein, examples include any combination of the following:

Wherein the restored value was received at the existing partition from the disaggregated storage tier at a time that a most recently written segment was written to the disaggregated storage tier by the existing partition.

Wherein the restored value is a timestamp originating from a clock associated with the disaggregated storage tier that indicates the time that the most recently written segment was written to the disaggregated storage tier by the existing partition.

Wherein the list of segments includes soft-deleted segments and active segments, and, for each segment, a corresponding value indicating the order of creation of the segments.

Wherein the corresponding values indicate a time of creation of the segments according to a clock associated with the disaggregated storage tier.

Wherein the method further comprises copying, to the restore account, additional segments associated with the existing partition that were created before the first segment.

Wherein the copying of the first segment to the restore account comprises creating a copy of the first segment in the disaggregated storage tier and associating the copy with the restore account.

An example computer-readable storage medium storing instructions executable by a processing apparatus to perform operations including: at a point-in-time restore service, receiving a restore request, the restore request comprising an identification of an existing database having an existing partition and a designated point-in-time; in response to the restore request, creating a restore account and restoring, to the restore account, a restored partition of the database to a state of the existing partition at the designated point-in-time, the restored partition including data restored from the point-in-time of the existing partition; reading a restored value, the restored value being a component of the data; obtaining a list of segments written to a disaggregated storage tier by the existing partition, the disaggregated storage tier comprising a first segment associated with a first value and a second segment associated with a second value, the first and second values indicating an order of creation of the first and second segments; performing a first comparison, the first comparison comparing the restored value to the first value, the first comparison indicating that the restored value was generated before the creation of the first segment; performing a second comparison, the second comparison comparing the restored value to the second value, the second comparison indicating that the restored value was generated after the creation of the second segment; and copying the first segment and not the second segment to the restore account based on the first comparison and the second comparison.

Alternatively, or in addition to the other examples described herein, examples include any combination of the following:

Wherein the restored value was received at the existing partition from the disaggregated storage tier at a time that a most recently written segment was written to the disaggregated storage tier by the existing partition.

Wherein the restored value is a timestamp originating from a clock associated with the disaggregated storage tier that indicates the time that the most recently written segment was written to the disaggregated storage tier by the existing partition.

Wherein the list of segments includes soft-deleted segments and active segments, and, for each segment, a corresponding value indicating the order of creation of the segments.

Wherein the corresponding values indicate a time of creation of the segments according to a clock associated with the disaggregated storage tier.

Wherein the operations further comprise copying, to the restore account, additional segments associated with the existing partition that were created before the first segment.

Example Operating Environment

Figure 6:
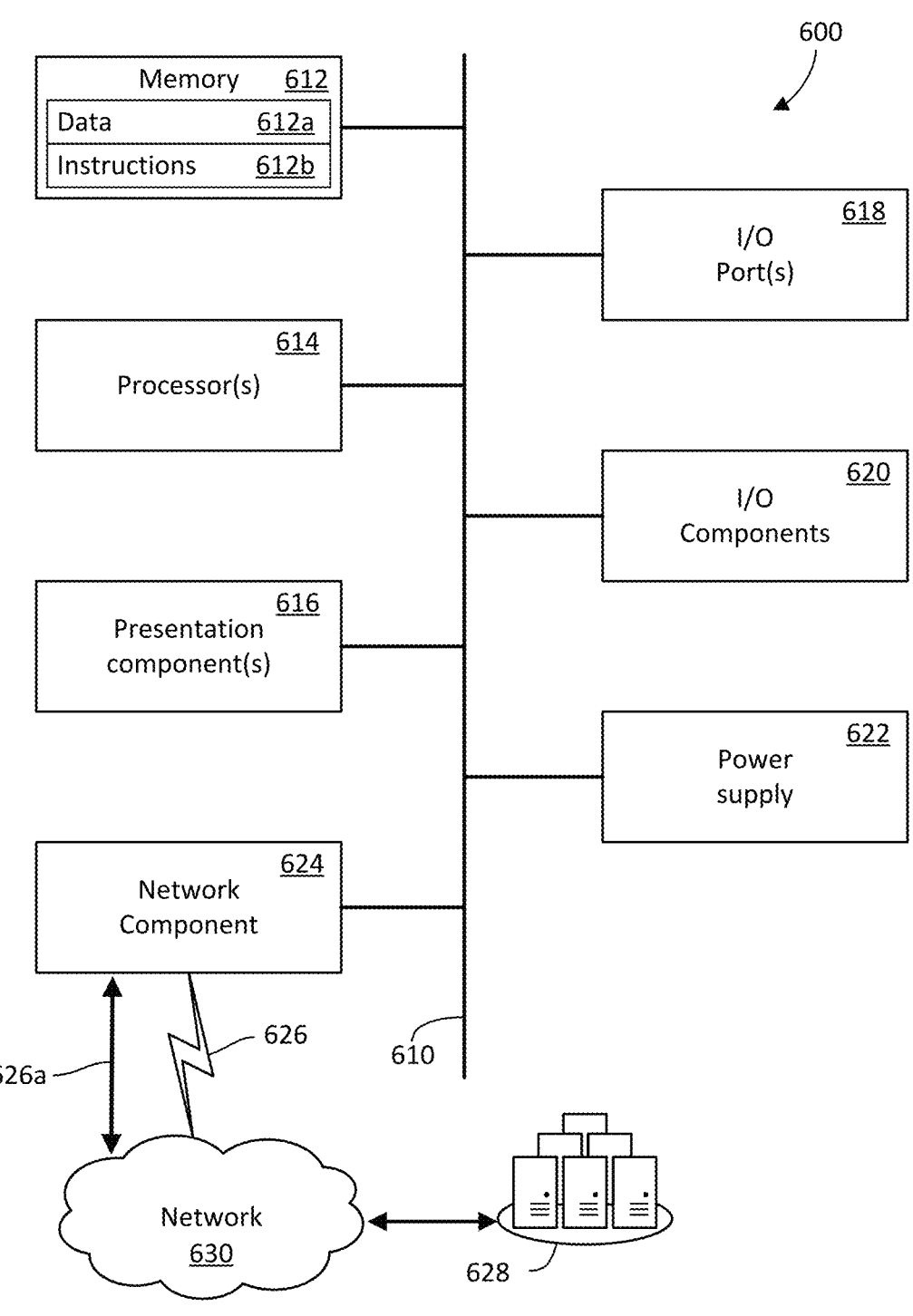
FIG. 6 is a block diagram of an example computing device for implementing computing operations disclosed herein.

FIG. 6 is a block diagram of an example computing device 600 for implementing computing operations disclosed herein, designated generally as computing device 600. In some examples, one or more computing devices 600 are provided for an on-premises computing solution. In some examples, one or more computing devices 600 are provided as a cloud computing solution. In some examples, a combination of on-premises and cloud computing solutions are used. Computing device 600 is but one example of a suitable computing environment and is not intended to suggest any limitation as to the scope of use or functionality of the examples disclosed herein, whether used singly or as part of a larger set.

Neither should computing device 600 be interpreted as having any dependency or requirement relating to any one or combination of components/modules illustrated. The examples disclosed herein can be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples can be practiced in a variety of system configurations, including personal computers, laptops, smart phones, mobile tablets, hand-held devices, consumer electronics, specialty computing devices, etc. The disclosed examples can also be practiced in distributed computing environments when tasks are performed by remote-processing devices that are linked through a communications network.

Computing device 600 includes a bus 610 that directly or indirectly couples the following devices: computer storage memory 612, one or more processors 614, one or more presentation components 616, input/output (I/O) ports 618, I/O components 620, a power supply 622, and a network component 624. While computing device 600 is depicted as a seemingly single device, multiple computing devices 600 can work together and share the depicted device resources. For example, memory 612 is distributed across multiple devices, and processor(s) 1014 is housed with different devices.

Bus 610 represents one or more buses (such as an address bus, data bus, or a combination thereof). Although the various blocks of FIG. 6 are shown with lines for the sake of clarity, delineating various components can be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 6 and the references herein to a "computing device." Memory 612 can take the form of the computer storage media referenced below and operatively provide storage of computer-readable instructions, data structures, program modules and other data for the computing device 600. In some examples, memory 612 stores one or more of an operating system, a universal application platform, or other program modules and program data. Memory 612 is thus able to store and access data 612a and instructions 612b that are executable by processor 614 and configured to carry out the various operations disclosed herein.

In some examples, memory 612 includes computer storage media. Memory 612 can include any quantity of memory associated with or accessible by the computing device 600. Memory 612 can be internal to the computing device 600 (as shown in FIG. 6), external to the computing device 600 (not shown), or both (not shown). Additionally, or alternatively, the memory 612 can be distributed across multiple computing devices 600, for example, in a virtual-ized environment in which instruction processing is carried out on multiple computing devices 600. For the purposes of this disclosure, "computer storage media," "computer-stor-age memory," "memory," and "memory devices" are syn-onymous terms for the computer-storage memory 6012, and none of these terms include carrier waves or propagating signaling.

Processor(s) 614 includes any quantity of processing units that read data from various entities, such as memory 612 or I/O components 620. Specifically, processor(s) 614 are programmed to execute computer-executable instructions for implementing aspects of the disclosure. The instructions can be performed by the processor, by multiple processors within the computing device 600, or by a processor external to the client computing device 600. In some examples, the processor(s) 614 are programmed to execute instructions such as those illustrated in the flow charts discussed below and depicted in the accompanying drawings. Moreover, in some examples, the processor(s) 614 represent an imple-mentation of analog techniques to perform the operations described herein. For example, the operations are performed by an analog client computing device 600 and/or a digital client computing device 600. Presentation component(s) 616 present data indications to a user or other device. Exemplary presentation components include a display device, speaker, printing component, vibrating component, etc. It should be understood that computer data can be presented in a number of ways, such as visually in a graphical user interface (GUI), audibly through speakers, wirelessly between computing devices 600, across a wired connection, or in other ways. I/O ports 618 allow computing device 600 to be logically coupled to other devices including I/O components 620, some of which can be built in. Example I/O components 620 include, for example but without limitation, a microphone, joystick, game pad, satellite dish, scanner, printer, wireless device, etc.

Computing device 600 can operate in a networked envi-ronment via the network component 624 using logical connections to one or more remote computers. In some examples, the network component 624 includes a network interface card and/or computer-executable instructions (e.g., a driver) for operating the network interface card. Commu-nication between the computing device 600 and other devices can use any protocol or mechanism over any wired or wireless connection. In some examples, network compo-nent 624 is operable to communicate data over public, private, or hybrid (public and private) using a transfer protocol, between devices wirelessly using short range com-munication technologies (e.g., near-field communication (NFC), Bluetooth™ branded communications, or the like), or a combination thereof. Network component 624 commu-nicates over wireless communication link 626 and/or a wired communication link 626_a_ to a remote resource 628 (e.g., a cloud resource) across network 630. Various different examples of communication links 626 and 626_a_ include a wireless connection, a wired connection, and/or a dedicated link, and in some examples, at least a portion is routed through the internet.

Although described in connection with an example com-puting device 600, examples of the disclosure are capable of implementation with numerous other general-purpose or special-purpose computing system environments, configu-rations, or devices. Examples of well-known computing systems, environments, and/or configurations that suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, dis-tributed computing environments that include any of the above systems or devices, virtual reality (VR) devices, augmented reality (AR) devices, mixed reality devices, holographic device, and the like. Such systems or devices might accept input from the user in any way, including from input devices such as a keyboard or pointing device, via gesture input, proximity input (such as by hovering), and/or via voice input.

Examples are described in the general context of com-puter-executable instructions, such as program modules, executed by one or more computers or other devices in software, firmware, hardware, or a combination thereof. The computer-executable instructions can be organized into one or more computer-executable components or modules. Gen-erally, program modules include, but are not limited to, routines, programs, objects, components, and data structures that perform particular tasks or implement particular abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure include different computer-executable instructions or com-ponents having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communica-tion media. Computer storage media include volatile and nonvolatile, removable and non-removable memory imple-mented in any method or technology for storage of infor-mation such as computer readable instructions, data struc-tures, program modules, or the like. Computer storage media are tangible and mutually exclusive to communication media. Computer storage media are implemented in hard-ware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable program-mable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium for storing information for access by a computing device. In contrast, communication media typically embody computer readable instructions, data struc-tures, program modules, or the like in a modulated data signal such as a carrier wave or other transport mechanism and include any information delivery media.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In examples involving a general-purpose computer, aspects of the disclosure transform the general-purpose computer into a special-purpose computing device when configured to execute the instructions described herein.

It will be understood that the benefits and advantages described above can relate to one embodiment or to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures are implemented as software instructions encoded on a computer storage medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

As used herein, the term "set" is non-empty, and can also be referred to as a "group."

When introducing elements of aspects of the disclosure or the examples thereof, the articles "a," "an," "the," and "said" are intended to mean that there are one or more of the elements. The terms "comprising," "including," and "having" are intended to be inclusive and mean that there might be additional elements other than the listed elements. The term "exemplary" is intended to mean "an example of" The phrase "one or more of the following: A, B, and C" means "at least one of A and/or at least one of B and/or at least one of C."

While the aspects of the disclosure have been described in terms of various examples with their associated operations, a person skilled in the art would appreciate that a combination of operations from any number of different examples is also within scope of the aspects of the disclosure.

What is claimed is:

1. A computer system, the system comprising a processor and a memory storing software arranged to execute on the processor, the software comprising instructions operative upon execution by the processor to:

create a restore partition of a database in a restore account, the restore partition having a state of an existing partition of an existing database at a point-in-time, the restore partition including data matching corresponding data of the existing partition at the point-in-time;

read a restored value, the restored value being a component of the data;

obtain a list of segments written to a disaggregated storage tier by the existing partition, the list including a first identifier of a first segment associated with a first value and a second identifier of a second segment associated with a second value, wherein a comparison of the first and second values indicates an order of creation of the first and second segments;

perform a first comparison, the first comparison comparing the restored value to the first value;

perform a second comparison, the second comparison comparing the restored value to the second value; and based on the first comparison and the second comparison, copy the first segment and not the second segment to the restore account, whereby the restore partition is synchronized with segments in the disaggregated storage tier that are associated with the restore partition.

2. The computer system of claim 1, wherein the restored value was received at the existing partition from the disaggregated storage tier at a time that a most recently written segment was written to the disaggregated storage tier by the existing partition.

3. The computer system of claim 2, wherein the restored value is a timestamp originating from a clock associated with the disaggregated storage tier that indicates the time that the most recently written segment was written to the disaggregated storage tier by the existing partition.

4. The computer system of claim 1, wherein the list of segments includes soft-deleted segments and active segments, and, for each segment, a corresponding value indicating the order of creation of the segments.

5. The computer system of claim 4, wherein the corresponding values indicate a time of creation of the segments according to a clock associated with the disaggregated storage tier.

6. The computer system of claim 1, wherein the instructions are further operative upon execution by the processor to copy, to the restore account, additional segments associated with the existing partition that were created before the first segment.

7. The computer system of claim 1, wherein the copying of the first segment to the restore account comprises creating a copy of the first segment in the disaggregated storage tier and associating the copy with the restore account.

8. A computerized method comprising:

at a point-in-time restore service, receiving a restore request, the restore request comprising an identification of an existing database having an existing partition and a designated point-in-time;

in response to the restore request, creating a restore account and restoring, to the restore account, a restored partition of the database, the restored partition having a state of the existing partition at the designated point-in-time, the restored partition including data matching corresponding data of the existing partition at the point-in-time;

reading a restored value, the restored value being a component of the data;

obtaining a list of segments written to a disaggregated storage tier by the existing partition, the disaggregated storage tier comprising a first segment associated with a first value and a second segment associated with a second value, wherein a comparison of the first and second values indicates an order of creation of the first and second segments;

perform a first comparison, the first comparison comparing the restored value to the first value;

perform a second comparison, the second comparison comparing the restored value to the second value; and copy the first segment and not the second segment to the restore account, based on the first comparison and the second comparison, whereby the restored partition is synchronized with segments in the disaggregated storage tier that are associated with the restored partition.

9. The computerized method of claim 8, wherein the restored value was received at the existing partition from the disaggregated storage tier at a time that a most recently written segment was written to the disaggregated storage tier by the existing partition.

10. The computerized method of claim 9, wherein the restored value is a timestamp originating from a clock associated with the disaggregated storage tier that indicates the time that the most recently written segment was written to the disaggregated storage tier by the existing partition.

11. The computerized method of claim 8, wherein the list of segments includes soft-deleted segments and active segments, and, for each segment, a corresponding value indicating the order of creation of the segments.

12. The computerized method of claim 11, wherein the corresponding values indicate a time of creation of the segments according to a clock associated with the disaggregated storage tier.

13. The computerized method of claim 8, further comprising copying, to the restore account, additional segments associated with the existing partition that were created before the first segment.

14. The computerized method of claim 8, wherein the copying of the first segment to the restore account comprises creating a copy of the first segment in the disaggregated storage tier and associating the copy with the restore account.

15. A computer-readable storage medium storing instructions executable by a processing apparatus to perform operations comprising:

at a point-in-time restore service, receiving a restore request, the restore request comprising an identification of an existing database having an existing partition and a designated point-in-time;

in response to the restore request, creating a restore account and restoring, to the restore account, a restored partition of the database, the restored partition having a state of the existing partition at the designated point-in-time, the restored partition including data matching corresponding data of the existing partition at the point-in-;

reading a restored value, the restored value being a component of the data;

obtaining a list of segments written to a disaggregated storage tier by the existing partition, the disaggregated storage tier comprising a first segment associated with a first value and a second segment associated with a second value, wherein a comparison of the first and second values indicates an order of creation of the first and second segments;

performing a first comparison, the first comparison comparing the restored value to the first value, the first comparison indicating that the restored value was generated before the creation of the first segment;

performing a second comparison, the second comparison comparing the restored value to the second value, the second comparison indicating that the restored value was generated after the creation of the second segment; and copying the first segment and not the second segment to the restore account based on the first comparison and the second comparison, whereby the restored partition is synchronized with segments in the disaggregated storage tier that are associated with the restored partition.

16. The computer-readable storage medium of claim 15, wherein the restored value was received at the existing partition from the disaggregated storage tier at a time that a most recently written segment was written to the disaggregated storage tier by the existing partition.

17. The computer-readable storage medium of claim 16, wherein the restored value is a timestamp originating from a clock associated with the disaggregated storage tier that indicates the time that the most recently written segment was written to the disaggregated storage tier by the existing partition.

18. The computer-readable storage medium of claim 15, wherein the list of segments includes soft-deleted segments and active segments, and, for each segment, a corresponding value indicating the order of creation of the segments.

19. The computer-readable storage medium of claim 18, wherein the corresponding values indicate a time of creation of the segments according to a clock associated with the disaggregated storage tier.

20. The computer-readable storage medium of claim 15, wherein the operations further comprise copying, to the restore account, additional segments associated with the existing partition that were created before the first segment.

* * * * *